Feb. 5, 1963 L. Y. G. HALLBERG 3,076,747
PHARMACEUTICAL IRON PREPARATIONS
Filed Jan. 26, 1961
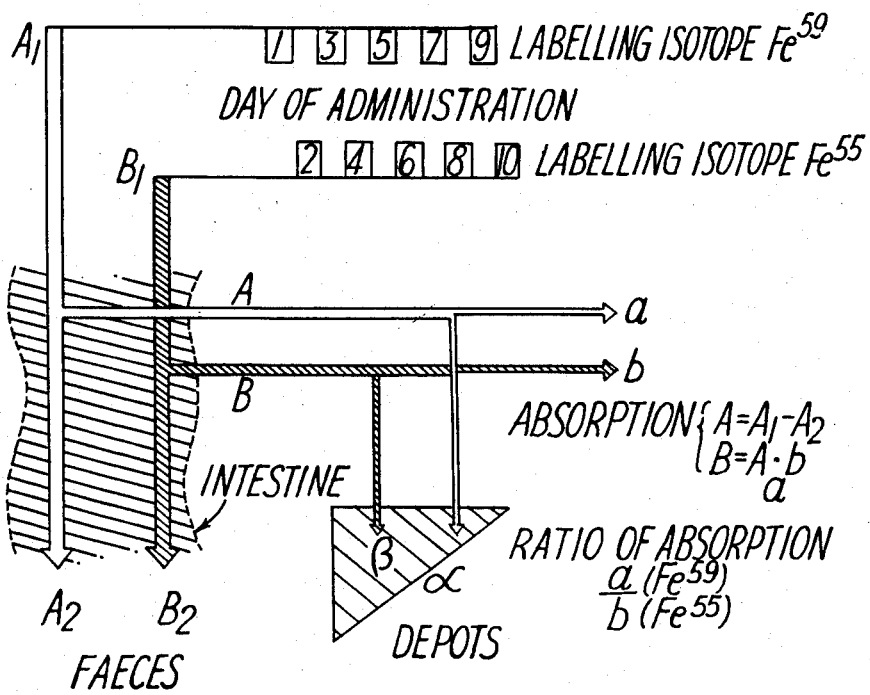
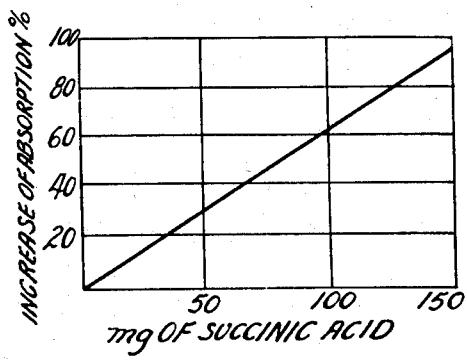
Inventor
Lief Yngve Hallberg
By
Stevens Davis Miller & Mosher
Attorneys

United States Patent Office 3,076,747
Patented Feb. 5, 1963

3,076,747
PHARMACEUTICAL IRON PREPARATIONS
Leif Yngve Gustav Hallberg, Goteborg, Sweden, assignor to Aktiebolaget Hassle Apotekare Paul Nordstroms Fabriker, Goteborg, Sweden, a Swedish body corporate
Filed Jan. 26, 1961, Ser. No. 85,033
Claims priority, application Sweden Feb. 3, 1960
13 Claims. (Cl. 167—68)

This invention relates to iron preparations for the treatment of iron deficiency by the oral route.

The treatment of iron deficiency nowadays is chiefly based on oral administration of iron. The reason for this is principally that parenteral iron treatment, for instance by intramuscular or intravenous iron injections, cannot be carried out by the patient himself, commonly causes undesirable reactions in the patient and also local undesirable effects at the site of administration, for instance pains and marked discoloration of skin. Deaths have even occurred as a result of shock resulting from parenteral iron administration. The risks are always greater by parenteral than by oral administration.

Even when administered orally, common iron preparations cause gastrointestinal side reactions like diarrhoea, nausea, constipation and a feeling of discomfort in up to 20% of the treated cases. Indeed, some people cannot tolerate any iron preparations. The degree of severity of the side effects is normally dependent on the magnitude of the iron dose administered, which usually has to be several times larger than the amount of iron to be absorbed. To overcome the disadvantages of the existing iron preparations it has been proposed to divide up the total amount of iron taken in the whole day and administer the iron in repeated small dosages at intervals during the day, but this is, however, inconvenient for the patient and does not solve in a satisfactory way the problem of eliminating the undesirable side reactions.

Another disadvantage of known oral iron preparations is the difficulty of building up the iron stores of the body fast enough. These preparations will only increase the iron content of the stores with acceptable speed at the beginning of the period of administration. Further supply of iron to the stores necessitates administration over a very long period of time.

Liquid preparations for oral administration have the additional disadvantage that their iron taste is unpleasant to most patients, and they discolour the patient's teeth.

There is, therefore, a great need for an iron preparation, especially in tablet form, which possesses a substantially improved absorption compared with previously known preparations, since such a preparation would make it possible to administer a smaller dosage with the same or greater effect but accompanied by less frequent and severe side reactions. Such an improved preparation would also make it possible wholly or partly to replace the intramuscular or intravenous iron injections hitherto unavoidable in some cases.

An object of the invention is to provide iron preparations which include an absorption promoter which greatly enhances absorption of the iron component on oral administration.

According to the invention there are provided pharmaceutical iron preparations capable of administration by the oral route which comprise a mixture of a ferrous compound and, as a promoter of iron absorption, a succinate (as hereinafter defined) in an amount more than equivalent to the amount of ferrous compound, both said ferrous compound and said succinate being physiologically innocuous and readily soluble in gastric or intestinal fluids or both.

If desired, the preparations may include a physiologically innocuous carrier. By the expression "physiologically innocuous," when used herein in connection with ferrous compounds, succinates and carriers, is meant that the substance is not harmful to humans on administration by the desired route.

Examples of the readily soluble ferrous compounds that can be used in the preparations of the invention are inorganic, organic and complex ferrous compounds, such as ferrous sulphate, ferrous chloride, ferrous gluconate and ferrous sulphate-glycine complex.

The absorption promoter in the preparations is a succinate, a term which is used herein to mean succinic acid, succinic anhydride or a salt of succinic acid. Examples of suitable salts of succinic acids are sodium, ammonium, and magnesium succinate.

Although the succinate must be employed in an amount more than equivalent to the amount of ferrous compound present, i.e. there must be more than one mole of succinate (calculated as succinic acid) for each gram atom of iron, the actual excess of succinate used is not critical. In general, however, the increase of absorption obtained is greater the greater the amount of succinate administered (cf. FIGURE 2 of the drawings attached hereto). In determining the appropriate ratio of ferrous compound:succinate to reach the absorption desired it must be borne in mind that the administration of a small amount of iron gives a greater percent absorption than a large one. When the iron dose administered amounts to about 10 mg., 30 mg. to 500 mg. of succinic acid are especially suitable for the purpose; this corresponds to about 1.5–24 equivalents of succinic acid per equivalent of iron. At greater iron doses, for instance ca. 30 mg. of iron, the amount of succinic acid component is preferably between 65 mg. and 750 mg., i.e. more than 1 up to 12 equivalents of succinic acid per equivalent of iron.

The iron preparations of the invention may have incorporated in them other substances so as to produce therapeutically useful compositions which are suitable for specific purposes. Such a preparation includes tablets comprising a pharmaceutical carrier (such as fillers, binders, lubricants, and disintegrating agents), together with the essential components of the invention, but in some cases other dosage forms may be advantageous, such as solutions, capsules and syrups.

Examples of suitable solid carriers are starch, gelatin, talc, stearic acid and magnesium stearate. Suitable binders include liquid glucose, starch paste, acacia solution and gelatin solutions. Conventional tableting materials used in pharmaceutical practice may be employed provided that they are compatible with the ferrous compound and the succinic acid.

Other additives useful in the preparation of oral iron preparations may also advantageously be included, such as stabilizing agents, for instance sorbitol and ascorbic acid, surface active agents, pH-regulators, vitamins, flavour essences, sugar and the like.

The iron preparations of the invention are especially well suited for solid preparations such as tablets and capsules, since they make it possible to use very soluble ferrous compounds, such as ferrous sulphate and ferrous chloride. When such compounds are used the iron salt dissolves rapidly so that a high concentration is attained in the gastrointestinal canal. Sparingly soluble salts, e.g. ferrous tartrate and ferrous succinate are dissolved comparatively slowly and do not give as high a concentration, which causes less absorption.

Because of their strongly increased absorption compared to previously known iron preparations without absorption promoters the preparations of the invention permit administration with considerably diminished iron dosages; gastrointestinal side effects therefore do not occur or are diminished. With the preparations of the invention it is also possible to fill the stores of the body more rapidly by oral administration, so that the need for intramuscular and intravenous iron treatment is reduced.

Great divergencies of opinion have existed regarding the absorptivity of the various iron compounds that have been previously suggested for oral use, and the true course of the absorption has not been determined with certainty. This results to some extent from the difficulty of objectively measuring and comparing the absorption of different compounds. The method commonly used is to follow the regeneration of haemoglobin in patients with iron deficiency after treatment with iron. In this method different groups of patients are treated with different iron compounds and the regeneraiton obtained is compared at certain intervals. Very often, however, the results of such experiments are misleading and an objective observer would frequently draw conclusions different from those enunciated by the worker.

The most important sources of error and difficulty in comparing different iron compounds when using the method mentioned above are connected with the many factors that affect the rate of absorption. The latter varies between different individuals and also within a single individual, depending on such factors as degree of anaemia, magnitude of iron dosage and the presence of iron in the iron stores from which the iron can be mobilized, for instance in acute bleeding anaemia. A single investigator has often examined the effect of only one iron compound. The test conditions, therefore, quite frequently are different in different investigations, and this, as mentioned above, has a considerable influence on the results. Moreover, different amounts of iron have been given to different groups of patients and the effects compared, which gives misleading results, since the degree of adsorption inter alia depends upon the amount of iron administered (the percentage absorption from a small dose is greater than from a large dose).

Patients with acute bleeding anaemia have not always been explicitly excluded as test subjects and the degree of anaemia has not been defined, etc. Misleading results, therefore, easily are obtained. Where cases with acute bleeding anaemia are included in the tests, practically always too high an absorption is observed if the absorption is determined from the haemoglobin increase, because iron is obtainable partly from the iron absorbed and partly from the body's own stores. In test subjects with pronounced iron deficiency anaemia more rapid regeneration is obtained than with subjects whose average degree of anaemia is less pronounced. Furthermore, in some investigations the amount of iron administered has been so great that the amount of iron absorbed has not exerted any decisive influence on the rate of regeneration, i.e. the amount, in all groups compared, has exceeded the amount of iron needed by the bone-marrow for optimal rate of regeneration.

A method of comparison which has given rise to much lack of clarity is the estimation of the so-called utilization coefficients for different iron compounds. By the term "utilization coefficient" is meant the percentage of the iron supplied which is absorbed in a certain period of time and utilized for the formation of haemoglobin. This method of comparison can be totally misleading for several reasons, the most important of which is that the daily amounts of iron supplied in different series of investigations have been of different magnitude. Since no experiments have been made to find the smallest daily amount of iron which gives optimal regeneration, a utilization coefficient calculated this way will only be roughly inversely proportional to the daily amount of iron supplied and not an objective measure of the absorbtivity of different iron compounds. In addition it may be incorrectly high if cases with acute bleeding anaemia and a substantial amount of iron in their iron stores are included in the test subjects because one could then theoretically attain utilization coefficients greater than 100% using small iron doses, which is absurd.

From the foregoing, it is clear that an iron preparation cannot be regarded as medically justified merely because clinical investigations carried out in the traditional manner are held to point to a therapeutical effect.

A special technique for the study of iron absorption has now been worked out by means of which it is now possible to obtain reliable values of the absorption ratio of iron under various conditions. The method in principle is based on the use of two iron isotopes—$Fe^{55}$ and $Fe^{59}$—and the subsequent determination of radioactivity in blood, faeces, etc. This technique has been used partly to study the general factors that influence the mechanism of absorption and partly to compare the absorption of different iron preparations. By the first investigations the amount of iron absorbed per unit of time has been estimated by labelling orally taken iron with one isotope of radio-iron (for instance $Fe^{55}$) and at the same time intravenously administering a trace-dose of another isotope of radio-iron ($Fe^{59}$) for the continuous determination of the outflow of iron from plasma, which has not previously been possible. By this procedure the following facts, inter alia, have been established or confirmed:

(1) A tenfold increase of iron concentration in the orally administered solution only leads to a fivefold increase in the iron concentration in the duodenum. Part of the ingested iron is precipitated, is absorbed, or reacts with proteins in the gastrointestinal lumen.

(2) In patients with iron deficiency the rate of absorption of iron is considerably greater than in those without iron deficiency.

(3) Decreased iron stores lead to increased iron absorption.

(4) The iron stores of the body can be increased by oral administration of iron, a fact which previously was doubted.

(5) The transport of iron from intestine through mucosa to plasma runs only in this direction.

(6) The factors influencing the rate of transportation of iron from intestine to plasma, i.e. the rate of absorption, are the iron concentration in the intestine and the concentration of transferrin-bound iron (i.e. real serum iron) and transferrin in plasma. The two last factors are in turn influenced by the erythropoitic activity and the condition of the iron stores.

(7) The so-called "mucosal block" is and may be an effect of changed concentration gradients between different compartments, intestinal lumen—mucosal cells —plasma.

(8) Under pathological conditions the rate of absorption depends also on the size of the intestinal area and the nature of the mucosa in the compartments where iron may exist in ion form.

(9) The serum iron-transferrin-system forms a sort of regulating mechanism by means of which increased need of iron causes increased iron absorption. This mechanism of regulation will only prevent anaemia and hemosiderosis within certain limits.

It has now been possible to work out a method which gives correct comparison between the absorptivity of different iron compounds. According to this method the absorption of different iron compounds is measured simultaneously and on the same patient by the use of two iron isotopes and an apparatus for the simultaneous determination of the intensity of radiation of these two isotopes. The principal arrangement of the tests for each patient is shown in FIGURE 1. In this figure $A_1$ and $A_2$ represent the total amounts of $Fe^{59}$ administered and excreted respectively, and $B_1$ and $B_2$ the corresponding amounts of $Fe^{55}$. The total amount of iron absorbed is represented by A and B respectively, and that part of the iron absorbed, which takes part in the formation of red blood-corpuscles (erythropoiesis) is represented by $a$ and $b$ respectively. The part absorbed and stored in the iron-stores of the body is represented by α and β respectively. The true absorption ratio A/B is proportional to the measured a/b, provided that the variation in the distribution of the iron absorbed between erythropoiesis and stores a and α, and b and β respectively of each individual is small, as has been shown to be the case in separate tests.

30 mg. of iron was administered to the patients on an empty stomach every morning for 10 days, on even days labelled with $Fe^{55}$, and on odd days labelled with $Fe^{59}$. The iron dose labelled with $Fe^{59}$ was given as a solution of ferrous sulphate and was taken as a reference in all experiments. On the five alternate days when the iron was labelled with $Fe^{55}$, the iron compound, whose absorption ratio was to be tested, was given.

In this way five pairs of doses on the same individual were obtained. The effect of varying absorption on different days was thereby diminished and also the effect of variations in the distribution of the absorbed iron between erythropoiesis and stores. In addition, the effect of variations of other factors, known and unknown, are diminished and the test person constitutes his own control. The mean value of the absorption ratio in the five pairs of doses for one individual, i.e. a/b in FIGURE 1, was obtained by analysis of $Fe^{55}$ and $Fe^{59}$ in blood samples, which were taken at the earliest two weeks after the last iron dose. Consequently this absorption ratio was not influenced by the average distribution of absorbed iron between red blood cells and stores. The actual absorption has in some cases been determined by quantitative collection of faeces for at least 18 days. The total amount of isotope supplied to each test person is very small, usually about 20 μc. $Fe^{59}$ and 20 μc. $Fe^{55}$. The method was checked by administering both isotopes as ferrous sulphate, whereby an average absorption ratio of 1.02 with a distribution of ca. 5% was obtained.

By this method for measuring the absorption ratio the long maintained opinion that ferrous sulphate is among the best absorbed of iron compounds is, on the whole, confirmed. Preliminary investigations with solutions of the sparingly soluble ferrous succinate have shown a somewhat greater absorption than has been obtained from solutions of ferrous sulphate. Different results are, however, obtained when these substances are administered in form of tablets because of their different solubilities. Before any absorption can occur the tablets must disintegrate and the iron compound dissolve. The absorption of iron takes place substantially exclusively in the upper part of the small intestine and thus it only occurs for a limited period after the administration of an iron dose. The time of disintegration of the tablet and also the solubility and rate of dissolution of the iron compound are of great importance in determining the magnitude of absorption. If ferrous sulphate and ferrous succinate are thus compared it is found that both the solubility and the rate of dissolution of ferrous succinate are less than one tenth of the corresponding values for ferrous sulphate at the lowest pH usually existing in the stomach (ca. pH 1). Since the time of decomposition of iron tablets is relatively long, generally more than 30 minutes, the dissolution of the iron compounds in the tablets will mainly take place in the upper part of the small intestine. The ratio of the solubility and the rate of dissolution of ferrous succinate and ferrous sulphate is however only 1:20 at the higher pH of the small intestine (pH ca. 5–6). The conditions for dissolution and absorption of ferrous succinate are, therefore, even less favourable than in the stomach. The considerably lower rate of dissolution of ferrous succinate is the probable reason why, despite the slightly increased absorption of iron from solutions of ferrous succinate, the absorption of iron from tablets of ferrous succinate is not better than the absorption from tablets of ferrous sulphate.

Table I below shows the amounts (in g. of Fe/ml.) of ferrous succinate and ferrous sulphate which have gone into aqueous solution after different times of shaking 40 g. ferrous sulphate ($FeSO_4 \cdot 7H_2O$) and 20 g. ferrous succinate (trihydrate) respectively in 50 ml. of solvent at 37° C. at various pH levels.

TABLE I

Ferrous sulphate ($7H_2O$)

| Time | pH 1 (0.1 N HCl) | pH 5.5 (1/20 M bicarbonate—HCl buffer) | pH 7 (water) |
| --- | --- | --- | --- |
| 2 min | 0.054 | 0.057 | 0.053 |
| 5 min | 0.063 | 0.057 | 0.068 |
| 10 min | 0.095 | 0.071 | 0.095 |

Ferrous succinate ($3H_2O$)

| | | | |
| --- | --- | --- | --- |
| 2 min | 0.0035 | 0.0016 | 0.0016 |
| 5 min | 0.0054 | 0.0035 | 0.0039 |
| 10 min | 0.0079 | 0.0040 | 0.0038 |
| 20 min | 0.0085 | 0.0038 | 0.0040 |

The basis of the present invention is that the absorption of iron in the gastrointestinal lumen is stimulated by succinic acid and similar compounds. FIGURE 2 shows comparative absorption tests for 21 test persons by the double isotope-method between $FeSO_4$ and $FeSO_4$ to which varying amounts of succinic acid have been added, in which the increase in absorption obtained by addition of succinic acid is expressed in percent of the absorption obtained under the same conditions using only $FeSO_4$. The dose administered was equivalent to 30 mg. of Fe. The test results given in the curve refer to test subjects with an adsorption range of 5–20% for $FeSO_4$. If persons are studied which have a greater need of iron and therefore show higher absorption, a considerably greater increase of the absorption is obtained (200%). As is seen from FIGURE 2 the absorption increases strongly with increasing amounts of succinic acid, and at an addition of 150 mg. succinic acid per 30 mg. of iron an increase in absorption amounting to no less than 100% is obtained.

A possible explanation for this surprising absorption-promoting effect may be that the transport of iron from intestine to plasma is energy-absorbing and that succinic acid takes part in this system as an energy-donor. This explanation is strengthened by the observation that the addition of malonic acid blocks the absorption-promoting effect of the succinic acid. (Malonic acid blocks the sole intracellular enzyme succinodehydrogenas, which is necessary for the energy-absorbing metabolism of succinic acid.)

That the effect of succinic acid is connected with the transport through the intestinal wall and is not a result of stimulated haemopoiesis or increased storage of iron in the stores is shown by the fact that the presence of succinic acid does not measurably influence the further metabolism of iron in the body. In these investigations the turnover of iron in plasma was continually measured with the help of radio-iron. After one hour succinic acid was administered in an amount corresponding to earlier absorption tests, but no measurable increase in turnover could be detected.

The fact that ferrous sulphate and succinic acid each are integral parts of the preparation does not mean that sparingly soluble ferrous succinate is precipitated in the upper part of the small intestine. Since the solubility of ferrous succinate in the upper part of the small intestine is about 4 mg./ml. (cf. Table I, pH 5.5) and the amount of gastric and intestinal fluid that is available amounts to at least 50 ml., ferrous succinate will not precipitate unless the amount of iron in each dose is at least 200 mg. Such dose is about 5 times greater than the one normally used.

The invention is illustrated in the following examples. The sequence of mixing operations shown in the examples can, of course, be modified to suit any particular case.

Example I

Solution containing circa 40 mg. Fe per 10 ml.:
- Ferrous chloride (4H$_2$O) _____ 1.4 g.
- Succinic acid _____ 2.0 g.
- Sugar _____ 30.0 g.
- Flavour-essence _____ q.s.
- Water _____ ad 100 ml.

The ferrous chloride, succinic acid and flavour-essence in the proportions given above are dissolved in 30 ml. of water, after which 50 ml. of sugar solution containing 30 g. of sugar is added with stirring. The resulting solution is diluted with water to a volume of 100 ml.

Example II

Solution containing circa 30 mg. Fe per 10 ml.:
- Ferrous chloride (4H$_2$O) _____ 1.0 g.
- Succinic acid _____ 6.0 g.
- Sorbitol (70%) _____ 50.0 g.
- Flavour-essence _____ q.s.
- Sodium hydroxide _____ q.s. ad pH 4.0.
- Water _____ ad 100 ml.

The succinic acid and the ferrous chloride are dissolved in the soribtol solution and about 30 ml. of water. The flavour-essence is added and then the pH is adjusted to 4.0 with 5 N sodium hydroxide solution. Water is finally added to a volume of 100 ml.

Example III

Syrup containing circa 50 mg. Fe per 10 ml.:
- Ferrous sulphate (7H$_2$O) _____ 2.5 g.
- Succinic acid _____ 6.0 g.
- Ascorbic acid _____ 3.0 g.
- Flavour-essences _____ q.s.
- Sodium hydroxide _____ ad pH 4.0.
- Sorbitol (70%) _____ ad 100 ml.

In 110 g. of 70% sorbitol solution succinic acid and 2 g. of sodium hydroxide are dissolved with stirring, after which ferrous sulphate and ascorbic acid are added and dissolved. The pH is adjusted to 4.0 with sodium hydroxide. Flavour-essences are then added and the volume is adjusted to 100 ml. with sorbitol solution.

Example IV

Solution containing circa 24 mg. Fe per 10 ml.:
- Ferrous gluconate (2H$_2$O) _____ 2.000 g.
- Succinic acid _____ 2.000 g.
- Ascorbic acid _____ 1.000 g.
- Aneurine hydrochloride _____ 0.020 g.
- Sodium riboflavin-5-phosphate __ 0.020 g.
- Nicotylamide _____ 0.150 g.
- Sorbitol (70%) _____ 40.000 g.
- NaOH _____ ad pH 3.5.
- Flavour-essences _____ q.s.
- Saccharin sodium _____ 0.002 g.
- Water _____ ad 100 ml.

The ascorbic acid, the aneurine hydrochloride, the riboflavin phosphate and the nicotylamide are dissolved in the sorbitol solution. The succinic acid and the ferrous gluconate are dissolved in 50 ml. of water. The two solutions are mixed, after which flavour-essences and saccharin sodium are added. The pH is adjusted to 3.5 with sodium hydroxide and the volume to 100 ml. with water.

Example V

Tablet containing circa 30 mg. Fe:                Milligrams
- Ferrous sulphate (7H$_2$O) _____ 150
- Succinic acid _____ 120
- Starch _____ 30
- Talc _____ 10

Ferrous sulphate, succinic acid and indifferentia are mixed in the above proportions and compressed to tablets of 9 mm. diameter. The resulting tablets are coated in the usual way with sugar, gelatin, starch and talc.

Example VI

Tablet containing circa 30 mg. Fe:                Milligrams
- Ferrous sulphate (7H$_2$O) _____ 150
- Succinic acid _____ 250
- Starch _____ 50
- Talc _____ 10

The powders are mixed in the above proportions, compressed to tablets of 11 mm. diameter, and then coated.

Example VII

Tablet containing circa 20 mg. Fe:                Milligrams
- Ferrous sulphate (sicc.) _____ 70
- Succinic acid _____ 120
- Aneurine mononitrate _____ 3
- Riboflavin _____ 2
- Sodium ascorbate (coated) _____ 50
- Starch _____ 40
- Talc _____ 20

The ferrous sulphate and the succinic acid are moistened with a 5% solution of polyvinylpyrrolidone in ethanol and granulated. The vitamins and indifferentia are mixed into the dry granulate. The mixture is compressed to tablets of 10 mm. diameter and coated.

Example VIII

Tablet containing circa 20 mg. Fe:                Milligrams
- Ferrous sulphate (7H$_2$O) _____ 100
- Ammonium succinate _____ 200
- Starch _____ 35
- Talc _____ 20
- Gelatin _____ 5

The ferrous sulphate and the ammonium succinate are granulated with a 10% solution of the gelatin. The starch and the talc are mixed into the dried granulate, after which the mixture is compressed to tablets of 11 mm. diameter and coated.

Example IX

Tablet containing circa 30 mg. Fe:                Milligrams
- Ferrous sulphate-amino acetic acid complex equivalent to 30 milligrams of Fe.
- Magnesium succinate _____ 200
- Starch _____ 40
- Talc _____ 20

The ingredients are thoroughly mixed in the above proportions and compressed to tablets of 11 mm. diameter and coated.

Example X

Tablet containing circa 30 mg. Fe:                Milligrams
- Ferrous chloride (4H$_2$O) _____ 100
- Succinic acid _____ 150
- Starch _____ 20
- Talc _____ 10

The ingredients are carefully mixed in the above proportions and compressed to tablets of 9 mm. diameter and coated.

Example XI

Capsule containing circa 30 mg. Fe:               Milligrams
- Ferrous sulphate (7H$_2$O) _____ 150
- Succinic acid _____ 250

The two substances are mixed and hard gelatin capsules are filled with the mixture. Alternatively, the two powders are mixed with paraffinum liquidium, after which the mixture is dispensed into soft gelatin capsules.

Example XII

Capsule containing circa 30 mg. Fe:
- Ferrous sulphate (7H$_2$O) _____milligrams__ 150
- Succinic acid _____do____ 200
- Aneurine mononitrate _____do____ 5
- Riboflavin _____do____ 5

| | | |
|---|---|---|
| Nicotylamide | do | 30 |
| Pyridoxine hydrochloride | do | 2 |
| Pantothenic acid | do | 5 |
| Vitamin $B_{12}$ | μg | 5 |
| Ascorbic acid | milligrams | 50 |

The ingredients are thoroughly mixed and hard gelatine capsules are filled with the mixture.

*Example XIII*

Syrup containing circa 40 mg. Fe per 10 ml.:

| | |
|---|---|
| Ferrous sulphate-amino acetic acid complex equivalent to 400 milligrams of Fe. | |
| Succinic acid | 2500 milligrams. |
| Flavour-essence | q.s. |
| Sugar syrup | ad 100 ml. |

The ferrous compound and the succinic acid are dissolved in 100 ml. of sugar syrup with heating to 40–50° C. The flavour-essence is then added with stirring.

*Example XIV*

Tonicum containing circa 30 mg. Fe per 10 ml.:

| | |
|---|---|
| Ferrous sulphate ($7H_2O$) | 1500 milligrams. |
| Succinic acid | 2000 milligrams. |
| Ascorbic acid | 1000 milligrams. |
| Aneurine hydrochloride | 10 milligrams. |
| Sodium riboflavin-5-phosphate | 15 milligrams. |
| Nicotylamine | 80 milligrams. |
| Pyridoxine hydrochloride | 10 milligrams. |
| Caffeine | 400 milligrams. |
| Sorbitol (70%) | 50,000 milligrams. |
| Saccharin sodium | 2 milligrams. |
| Flavour | q.s. |
| Sodium hydroxide | q.s. ad pH 3.5. |
| Water | ad 100 ml. |

The vitamins are dissolved in the sorbitol solution. In a solution of 2 g. succinic acid in 40 ml. of water, 0.4 g. caffeine is dissolved, after which the two solutions are mixed and ferrous sulphate and aromatic substances and saccharin sodium are added with stirring. The pH of the resulting solution is adjusted to 3.5 and the solution is diluted with water to 100 ml.

I claim:

1. Orally administrable pharmaceutical iron preparations comprising a ferrous compound which is physiologically innocuous and readily soluble in at least one of gastric and intestinal fluids in admixture with more than an equivalent amount of a promoter of iron absorption selected from the class consisting of succinic acid, succinic anhydride, and the magnesium, ammonium and alkali metal salts of succinic acid.

2. Orally administrable pharmaceutical iron preparations comprising ferrous sulphate in admixture with more than an equivalent amount of a promoter of iron absorption selected from the class consisting of succinic acid, succinic anhydride, and the magnesium, ammonium and alkali metal salts of succinic acid.

3. Orally administrable pharmaceutical iron preparations comprising ferrous chloride in admixture with more than an equivalent amount of a promoter of iron absorption selected from the class consisting of succinic acid, succinic anhydride, and the magnesium, ammonium and alkali metal salts of succinic acid.

4. Orally administrable pharmaceutical iron preparations comprising ferrous gluconate in admixture with more than an equivalent amount of a promoter of iron absorption selected from the class consisting of succinic acid, succinic anhydride, and the magnesium, ammonium and alkali metal salts of succinic acid.

5. Orally administrable pharmaceutical iron preparations comprising ferrous sulphate glycine complex in admixture with more than an equivalent amount of a promoter of iron absorption selected from the class consisting of succinic acid, succinic anhydride, and the magnesium, ammonium and alkali metal salts of succinic acid.

6. Orally administrable pharmaceutical iron preparations comprising ferrous sulphate in admixture with more than an equivalent amount of succinic acid.

7. Orally administrable pharmaceutical iron preparations comprising a ferrous compound which is physiologically innocuous and readily soluble in at least one of gastric and intestinal fluids in admixture with more than 1 but less than 24 equivalents of a promoter of iron absorption selected from the class consisting of succinic acid, succinic anhydride, and the magnesium, ammonium and alkali metal salts of succinic acid.

8. Orally administrable pharmaceutical iron preparations in the form of a tablet comprising a ferrous compound which is physiologically innocuous and readily soluble in at least one of gastric and intestinal fluids in admixture with more than an equivalent amount of a promoter of iron absorption selected from the class consisting of succinic acid, succinic anhydride, and the magnesium, ammonium and alkali metal salts of succinic acid.

9. Orally administrable pharmaceutical iron preparations in the form of a capsule of absorbable material containing a ferrous compound which is physiologically innocouous and readily soluble in at least one of gastric and intestinal fluids in admixture with more than an equivalent amount of a promoter of iron absorption selected from the class consisting of succinic acid, succinic anhydride, and the magnesuim, ammonium and alkali metal salts of succinic acid.

10. Orally administrable pharmaceutical iron preparations in solid form comprising a ferrous compound which is physiologically innocuous and readily soluble in at least one of gastric and intestinal fluids in admixture with more than an equivalent amount of a promoter of iron absorption selected from the class consisting of succinic acid, succinic anhydride, and the magnesium, ammonium and alkali metal salts of succinic acid.

11. Orally administrable pharmaceutical iron preparaitons comprising a ferrous compound which is physiologically innocuous and readily soluble in at least one of gastric and intestinal fluids in admixture with more than an equivalent amount of a promoter of iron absorption selected from the class consisting of succinic acid, succinic anhydride, and the magnesium, ammonium and alkali metal salts of succinic acid, and a physiologically innocuous carrier.

12. A method of treating iron deficiency which comprises administernig to a patient suffering from iron deficiency substantially simultaneously by the oral route a ferrous compound which is physiologically innocuous and readily soluble in at least one of gastric and intestinal fluids and, as a promoter of iron absorption, more than an equivalent amount of a compound selected from the class consisting of succinic acid, succinic anhydride, and the magnesium, ammonium and alkali metal salts of succinic acid.

13. A method of treating iron deficiency which comprises administering to a patient suffering from iron deficiency by the oral route an iron preparation in solid form comprising a mixture of ferrous sulphate with more than an equivalent amount of succinic acid.

References Cited in the file of this patent

Parekh et al.: J.A.M.A., 168 (8), page 1151, Oct. 25, 1958.

O'Sullivan et al.: Blood—J. Hematology, 11 (8), page 778 August 1956.